(12) United States Patent
Lin et al.

(10) Patent No.: US 7,808,482 B2
(45) Date of Patent: Oct. 5, 2010

(54) SLIM MOUSE

(75) Inventors: Chih-Hung Lin, Taipei (TW);
Hong-Che Yen, Taipei (TW);
Chang-Chih Wu, Taipei (TW);
Hsiao-Lung Chiang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 829 days.

(21) Appl. No.: 11/408,142

(22) Filed: Apr. 20, 2006

(65) Prior Publication Data
US 2007/0211028 A1     Sep. 13, 2007

(30) Foreign Application Priority Data
Mar. 7, 2006   (TW)   ............................... 95107510 A

(51) Int. Cl.
*G09G 5/08* (2006.01)
(52) U.S. Cl. ..................... 345/163; 345/164; 345/165; 345/167
(58) Field of Classification Search .......... 345/163–167
See application file for complete search history.

(56) References Cited

U.S. PATENT DOCUMENTS

| | | | |
|---|---|---|---|
| 6,304,249 B1 * | 10/2001 | Derocher et al. | 345/163 |
| 7,023,425 B2 * | 4/2006 | Casebolt et al. | 345/163 |
| 2003/0230680 A1 * | 12/2003 | Doan | 248/118.5 |

* cited by examiner

*Primary Examiner*—Alexander Eisen
*Assistant Examiner*—Stuart McCommas
(74) *Attorney, Agent, or Firm*—Apex Juris, pllc; Tracy M Heims

(57) ABSTRACT

A slim mouse includes a first housing, a second housing and a connecting member. The first housing includes a first front part and a first rear part, wherein the first rear part has a first slant. The second housing includes a second front part and a second rear part, wherein the second front part has a second slant. The connecting member includes a rotating shaft for connecting the first slant and the second slant, so that the second housing is rotatable with the rotating shaft and relative to the first housing.

6 Claims, 5 Drawing Sheets

SLIM MOUSE

FIELD OF THE INVENTION

The present invention relates to a slim mouse, and more particularly to a slim mouse having a rotatable housing.

BACKGROUND OF THE INVENTION

Due to the amazing power of personal computers, personal computers are developed to have various functions. For example, the person computers have word processing functions in the earlier stage and are nowadays used for presentation or used as amusement video tools.

For complying with these various functions of the personal computer, in addition to the conventional cursor control function, the mouse usually has additional function keys used as the controller for presentation control and/or video control.

In a case that the mouse is used as a cursor control device, by moving the mouse on a desk plane, the cursor shown on the display screen of the personal computer is moved in the corresponding movement direction of the mouse. In another case that the mouse is used as a remote controller for presentation control and/or video control, the mouse is held on the palm of the user's hand and the function keys are pressed down to input the operating instructions.

Generally, the appearance of the mouse used as the cursor control device and the appearance of the mouse used as the controller are different. In a case that the mouse is used as a cursor control device to be moved on the desk plane, the surface of the mouse contacting with the palm of the user's hand should be cambered rather than flat. The cambered surface of the mouse may facilitate supporting the palm of the user's hand. Whereas, in another case that the mouse is used as the remote controller, the user intends to design the mouse to have a flat shape as the common remote controller.

In other words, it is difficult to design a slim mouse having both functions of using as the cursor control device and the remote controller due to the above reasons. If the housing of the mouse is too thin, the mouse fails to meet the ergonomic demand when the mouse is moved on the desk plane. In contrast, for meeting the requirement of ergonomics, the height and thickness of the mouse should be increased. Under this circumstance, the touch feel of the mouse is impaired when the mouse is used as the remote controller.

In views of the above-described disadvantages resulted from the prior art, the applicant keeps on carving unflaggingly to develop an improved slim mouse according to the present invention through wholehearted experience and research.

SUMMARY OF THE INVENTION

It is an object of the present invention to provide a slim mouse having a second housing rotatable relative to a first housing.

In accordance with an aspect of the present invention, there is provided a slim mouse. The slim mouse comprises a first housing, a second housing and a connecting member. The first housing includes a first front part and a first rear part, wherein the first rear part has a first slant. The second housing includes a second front part and a second rear part, wherein the second front part has a second slant. The connecting member includes a rotating shaft for connecting the first slant and the second slant, so that the second housing is rotatable with the rotating shaft and relative to the first housing.

In an embodiment, the connecting member further includes a first connecting plate and a second connecting plate, and the rotating shaft is arranged between the first connecting plate and the second connecting plate such that the second connecting plate is rotatable relative to the first connecting plate.

In an embodiment, the connecting member further includes a perforation.

In an embodiment, the first slant includes a first notch, the second slant includes a second notch, and the rotating shaft is disposed within the first notch and the second notch.

In an embodiment, the first housing further comprises an optical sensor for generating cursor control signals, and second housing further includes a receptacle for accommodating at least a battery therein.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
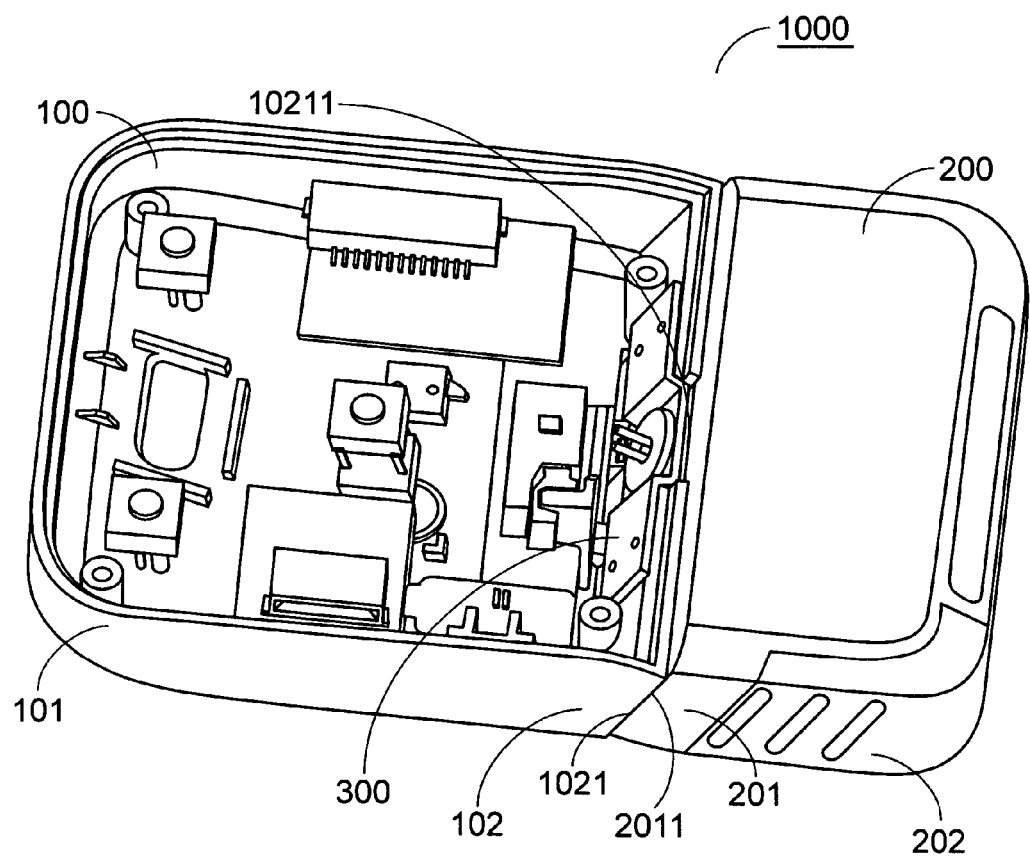
FIG. 1 is a schematic perspective view illustrating a slim mouse according to a preferred embodiment of the present invention.

Referring to FIG. 1, a schematic perspective view of a slim mouse according to a preferred embodiment of the present invention is illustrated. The slim mouse 1000 as shown in FIG. 1 comprises a first housing 100, a second housing 200 and a connecting member 300. The second housing 200 is rotatable relative to the first housing 100. The first housing 100 includes a first front part 101 and a first rear part 102. The second housing 200 includes a second front part 201 and a second rear part 202. The first rear part 102 has a first slant 1021. The second front part 201 has a second slant 2011. The first slant 1021 includes a first notch 10211, and the second slant 2011 includes a second notch 20111 (as is also shown in FIG. 2).

Figure 2:
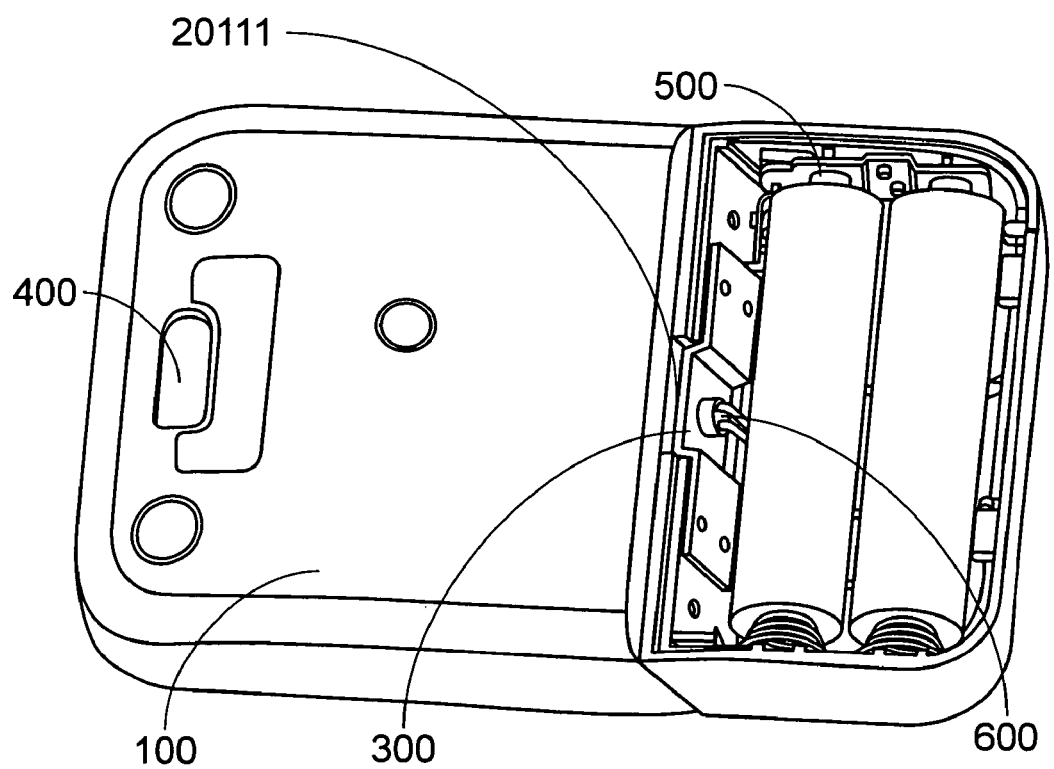
FIG. 2 is a schematic bottom view illustrating the slim mouse shown in FIG. 1.

Referring to FIG. 2, a schematic bottom view of the slim mouse of FIG. 1 is illustrated. The components for operating the mouse, for example the optical sensor 400 for generating cursor control signals by sensing the texture of the desk plane, are arranged within the first housing 100. The battery 500 for use with the mouse 1000 is accommodated within a receptacle of the second housing 200.

Figure 3:
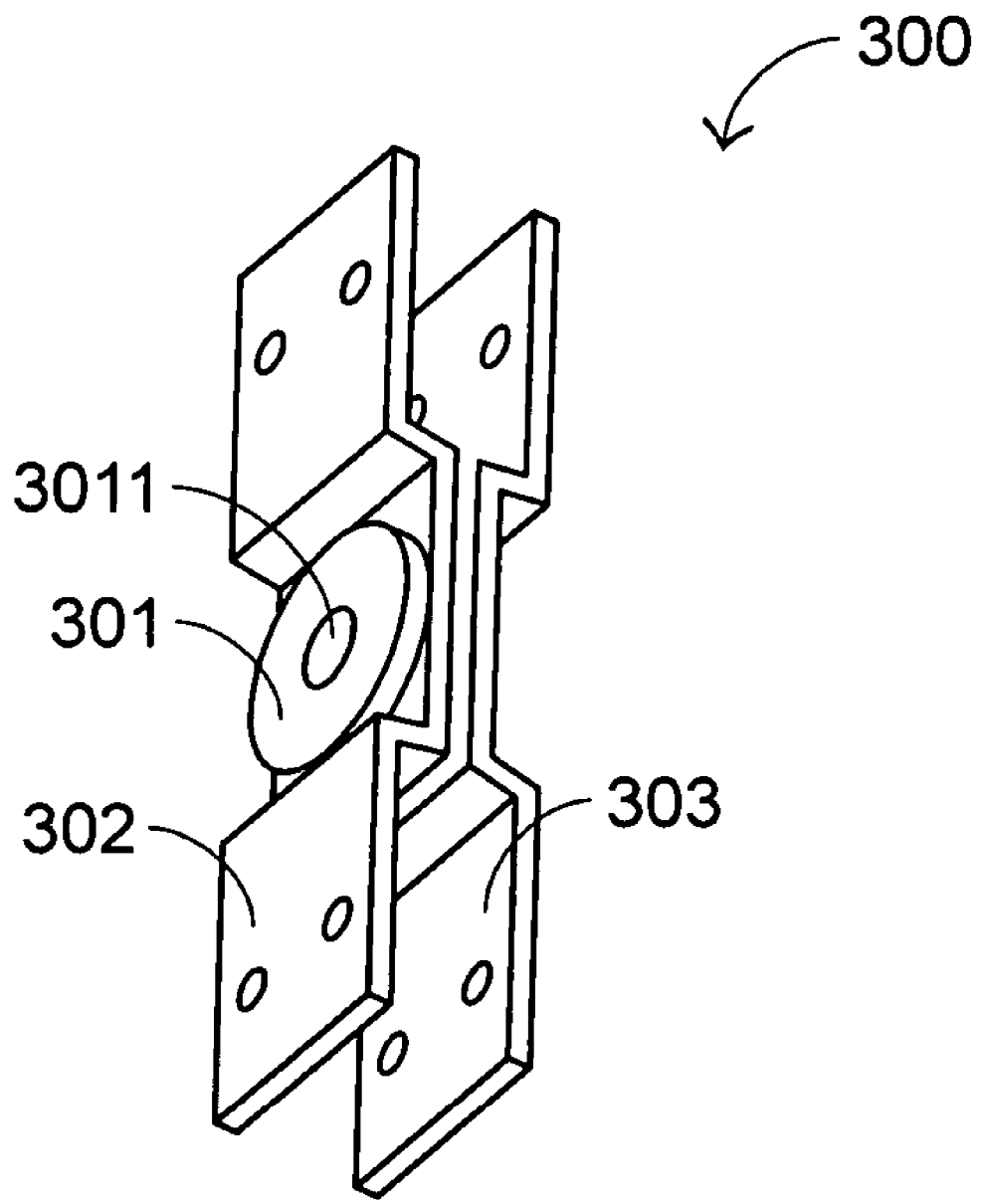
FIG. 3 is a schematic perspective view illustrating a connecting member used in the slim mouse of the present invention.

Referring to FIG. 3, a schematic perspective view of the connecting member 300 for connecting the first housing 100 and the second housing 200 is illustrated. The connecting member 300 of FIG. 3 comprises a rotating shaft 301, a first connecting plate 302 and a second connecting plate 303. The rotating shaft 301 further comprises a perforation 3011. The first connecting plate 302 is coupled to the second connecting plate 303 via the rotating shaft 301. The second connecting plate 303 is rotatable relative to the first connecting plate 302.

Please refer to FIG. 2 again. The conducting wire 600 has a terminal connected to the components inside the second housing 200 and is penetrated through the perforation 3011 of the connecting member 300 such that the other terminal of the conducting wire 600 is connected to the components inside the first housing 100.

Figure 4:
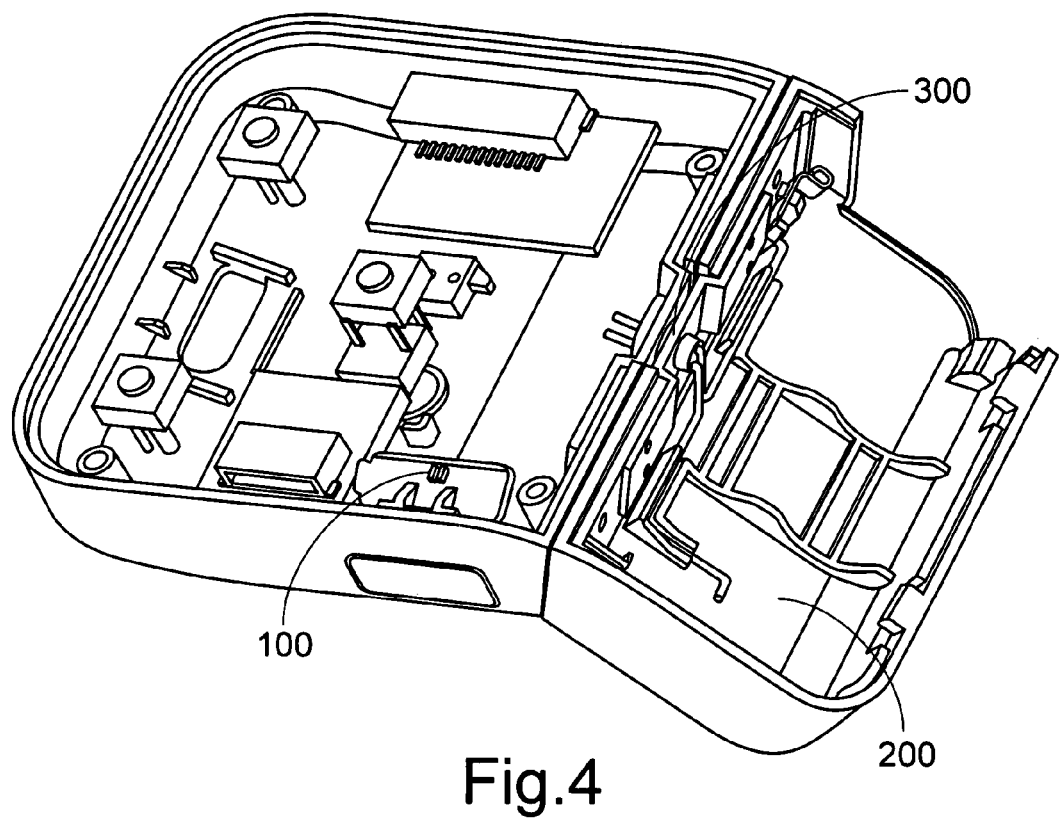
FIG. 4 is a schematic perspective view illustrating the slim mouse of FIG. 1 after the second housing thereof is rotated by 180 degrees.

Please refer to FIGS. 1, 2 and 3. The first connecting plate 302 of the connecting member 300 is fixed on the first slant 1021. The second connecting plate 303 is fixed on the second slant 2011. The rotating shaft 301 of the connecting member 300 is disposed within the first notch 10211 and the second notch 20111. By means of the rotating shaft 301, the second housing 200 is rotatable relative to the first housing 100. Please refer to FIG. 4, which illustrates the relative positions of the first housing 100, the second housing 200 and the connecting member 300 after the second housing 200 as shown in FIG. 1 is rotated by 180 degrees.

Figure 5A:
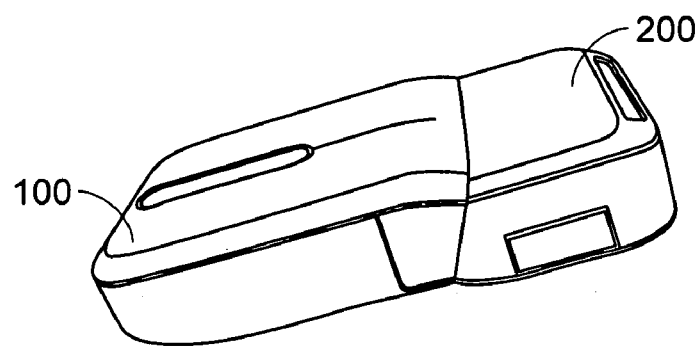
FIGS. 5(A)~5(C) are schematic views illustrating the operating mechanism of the slim mouse of the present invention.
Figure 5B:
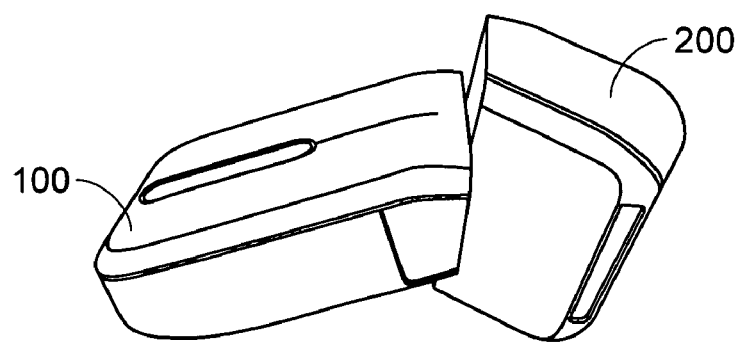
Figure 5C:
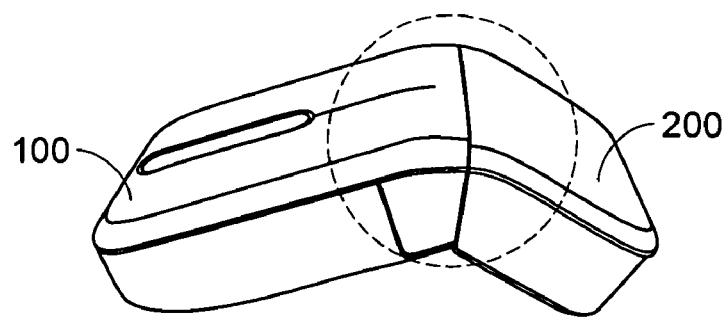

The operating mechanism of the slim mouse of the present invention will be illustrated in more details with reference to FIGS. 5(A)~5(C).

Referring to FIGS. 5(A)~5(C), the operating mechanism of the slim mouse of the present invention is schematically illustrated. In a case that the slim mouse is not acted as the cursor control device to be moved on the desk plane, the first slant 1021 of the first housing 100 is in contact with the second slant 2011 of the second housing 200. Under this circumstance, the slim mouse 1000 has a flat shape as shown in FIG. 5(A).

If the user intends to move the mouse on the desk plane, the second housing 200 should be rotated, as is shown in FIG. 5(B). After the second housing 200 is rotated by 180 degrees, the first slant 1021 of the first housing 100 is in contact with the second slant 2011 of the second housing 200 again, as is shown in FIG. 5(C). Due to the contact between the first slant 1021 and the second slant 2011, the slim mouse has a cambered shape as is indicated in the dashed circle. Under this circumstance, the mouse 1000 can be used as a cursor control device to be moved on the desk plane when the user's hand is placed on the cumbered surface.

Likewise, if the mouse is not acted as the cursor control device, the second housing 200 may be rotated by 180 degrees, so that the slim mouse 1000 is returned to have the flat shape again.

From the above description, since the second housing 200 is rotatable relative to the first housing 100, the slim mouse has both functions of using as either a cursor control device or a remote controller when the first slant 1021 of the first housing 100 is in contact with the second slant 2011 of the second housing 200. In other words, the mouse of the present invention may be adjusted to have a slim shape when acted as a remote controller and meet the ergonomic demand when acted as a cursor control device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A slim mouse comprising:
    a first housing including a first front part and a first rear part, said first rear part having a first slant;
    a second housing including a second front part and a second rear part, said second front part having a second slant; and
    a fixed horizontal connecting member including a rotating shaft that runs along a horizontal axis from said first front part of said first housing to said second rear part of said second housing of said mouse for connecting said first slant and said second slant, so that said second housing is rotatable with said rotating shaft and relative to said first housing in order to reconfigure and change the mouse shape such that the mouse may assume either a cambered shape or a flat shape.

2. The slim mouse according to claim 1 wherein said horizontal connecting member further includes a first connecting plate and a second connecting plate, and said rotating shaft is arranged between said first connecting plate and said second connecting plate such that said second connecting plate is 360° rotatable relative to said first connecting plate.

3. The slim mouse according to claim 1 wherein said horizontal connecting member further includes a perforation.

4. The slim mouse according to claim 1 wherein said first slant includes a first notch, said second slant includes a second notch, and said rotating shaft is disposed within said first notch and said second notch.

5. The slim mouse according to claim 1 wherein said first housing further comprises an optical sensor for generating cursor control signals, and second housing further includes a receptacle for accommodating at least a battery therein.

6. The slim mouse according to claim 1 where said first housing and said second housing form a flat surface when in a first position and when rotated about said shaft said first housing and said second housing form an arched surface when in a second position.

* * * * *